Figure 1:
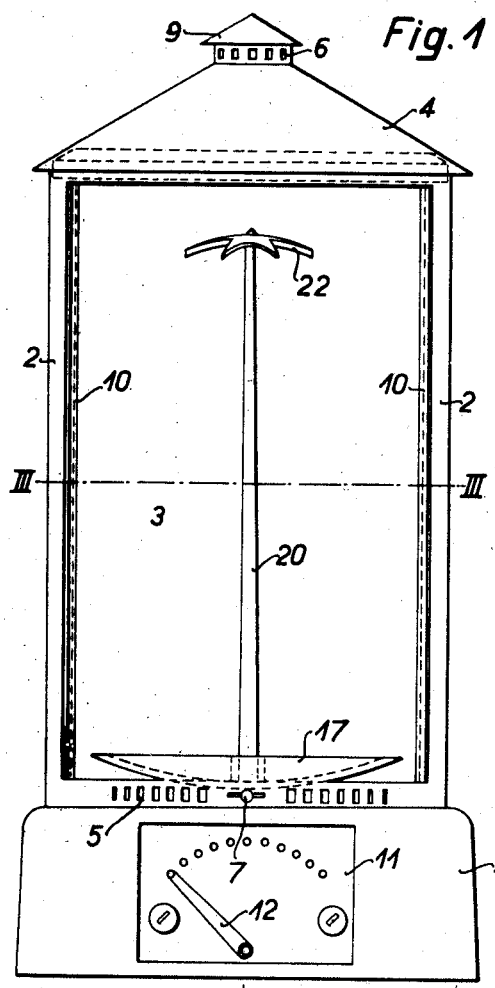

Aug. 4, 1936.  A. WALTERSPIEL  2,049,481
SYMMETRICAL VERTICAL ROASTER WITH AIR-COOLED DRIP PAN
Filed April 16, 1932  3 Sheets-Sheet 1

Inventor
Alfred Walterspiel.
By William C. Linton.
Attorney.

Aug. 4, 1936.  A. WALTERSPIEL  2,049,481
SYMMETRICAL VERTICAL ROASTER WITH AIR-COOLED DRIP PAN
Filed April 16, 1932  3 Sheets-Sheet 2

Inventor
Alfred Walterspiel.
By William C. Linton.
Attorney.

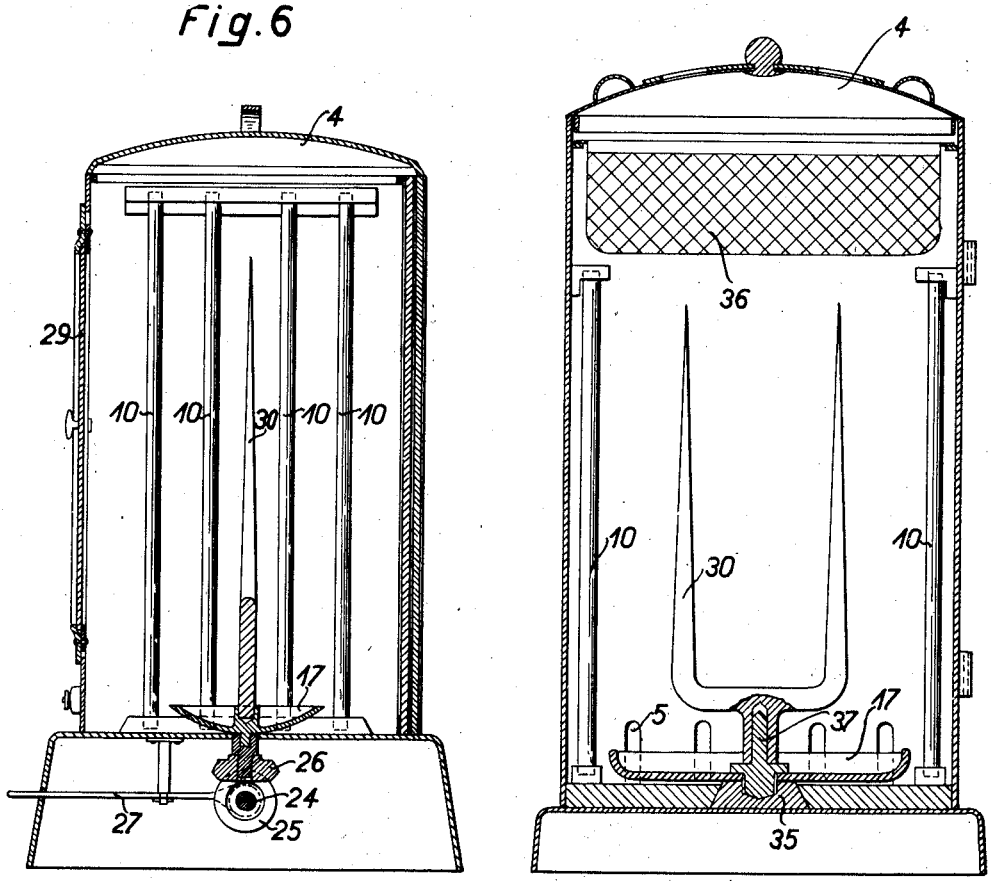

Patented Aug. 4, 1936

2,049,481

UNITED STATES PATENT OFFICE 2,049,481

SYMMETRICAL VERTICAL ROASTER WITH AIR-COOLED DRIP PAN

Alfred Walterspiel, Munich, Germany

Application April 16, 1932, Serial No. 605,718

9 Claims. (Cl. 219—35)

The object of the present application relates to a process and a device for roasting and baking food, e. g. meat, fish, poultry and the like. It is well known to roast food of this kind on so-called spits, such spits having until now always been in a horizontal position. The source of heat in arrangements of this kind used to be on one side, either below or beside the spit. In order to roast food on such spits elaborate preparations were always necessary and the food had to be perforated by the spit. There was considerable preparation for dressing meat, poultry, fish etc., for it was necessary to use counter-spits, dressing-hooks, lacing bands etc. A simpler way of roasting on the spit is that which is, for instance, practiced at the Munich October fair. Here the poultry, meat or fish is simply turned down over the spit and exposed to a charcoal fire. In this case too the flame is on one side only and it is not possible to obtain an evenly crisp skin on all sides, for when the spit is turned the part of the food which was over the fire comes into a colder position and consequently cools. Much heat has been wasted to the surrounding parts and did not benefit the food to be roasted. The fat which drips from the food, falls into the fire, is there burnt and thus wasted, besides causing the disadvantage of creating a disagreeable burnt smell.

By the process according to the present application the time of roasting is considerably shortened. A fowl of 4 lbs. weight, for instance, required until now 50 minutes in the kitchen roasting-oven, 70 minutes on the horizontal spit with the fire on one side, whereas with the process according to the present application it is done in 25 minutes at the utmost.

The process of the present application consists in the meat, poultry, fish and the like being no longer damaged by piercing with a spit but in being suspended or put up or supported, so that they are not injured and remain in a vertical position. As a consequence the air can, for instance with poultry, easily enter the hollow spaces in the frame of the dressed poultry and depart with the same ease above. A complete circulation is thus taking place. The dripping fat runs into a catching-pan which is warm because it is in a closed space, but which is in indirect heat exchange relationship with the heating elements and there is no direct contact with the fire or direct exposure to the radiant energy, so that burning of the fat and the creation of disagreeable burning odors are thereby avoided. In the process according to the present application the food is not injured and the running-out of the juice is also prevented. During the process of roasting the spit is very slowly turned around its vertical axis so that the food attached to it can be led slowly past the sources of heat arranged round about in the chamber. It is of course advisable to regulate both the speed of the revolution and the intensity of the heat, which is best done by using electric current both for heating and motion.

It is further particularly advisable, in order to carry out the process, to render the device visible, which is effected by having the side-wall made of glass so that the roasting can be observed without any difficulty.

In roasting according to the present application the great advantage consists, however, not alone in the saving of time, but there are other advantages connected with it both in a hygienic respect and in regard to economy and practical efficiency; further in the fact that the food to be roasted remains perfect in juice and taste, as it cannot take on any smell of iron or pans and as during the roasting process a constant application of the heat takes place on all sides. There have been known turn-spits which are heated electrically; these have the disadvantage that the juice flowing out dries up so that the roast smells of burnt meat-juice and also the chamber takes on that odor. This is avoided by the process according to the present application. Only at the last moment a smell is noticeable to a very faint degree, but even this smell can be destroyed by providing a smoke-absorber or similar contrivances.

It is to be particularly noted that in the process according to the present application every piece of food is roasted in its own juice and that it is unnecessary to add other fats to it. This has until now been necessary in order to prevent burning and to provide a substitute for the burnt fat.

Figure 2:
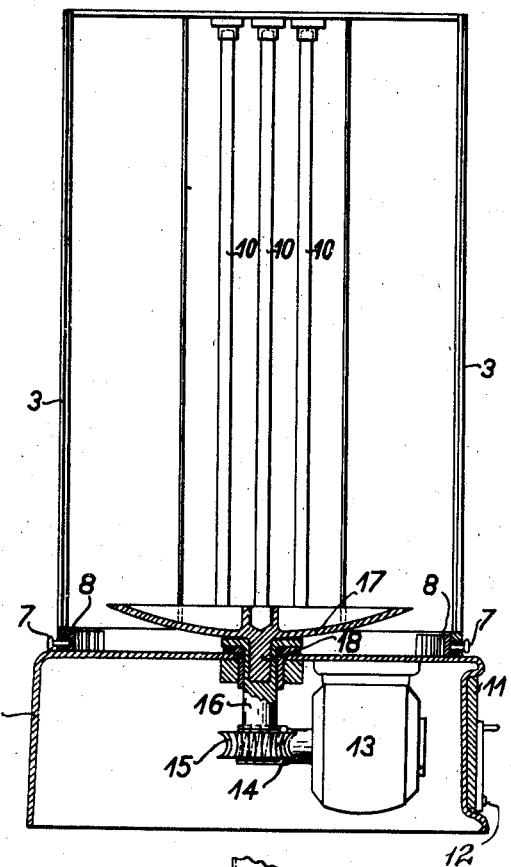
Figure 3:
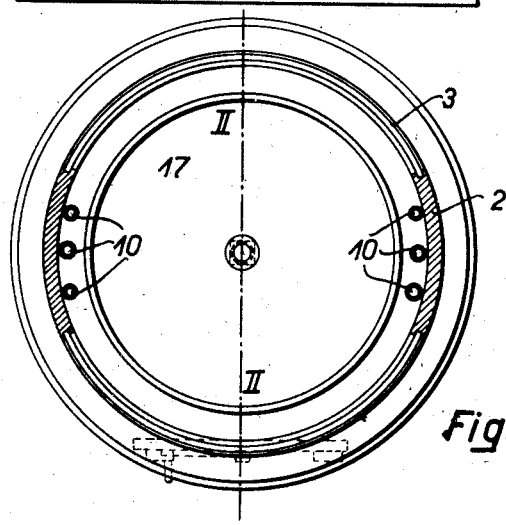

The object of the present application has been depicted in the accompanying drawings of a form of construction by way of example:

Fig. 1 represents the device in front view,

Fig. 2 a section through the device according to the line II—II of Fig. 3,

Fig. 3 a horizontal section view of the device on line III—III of Fig. 1.

Figure 4:
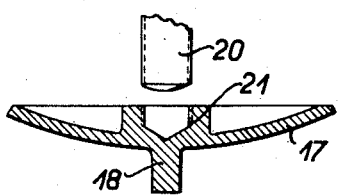
Figure 5:
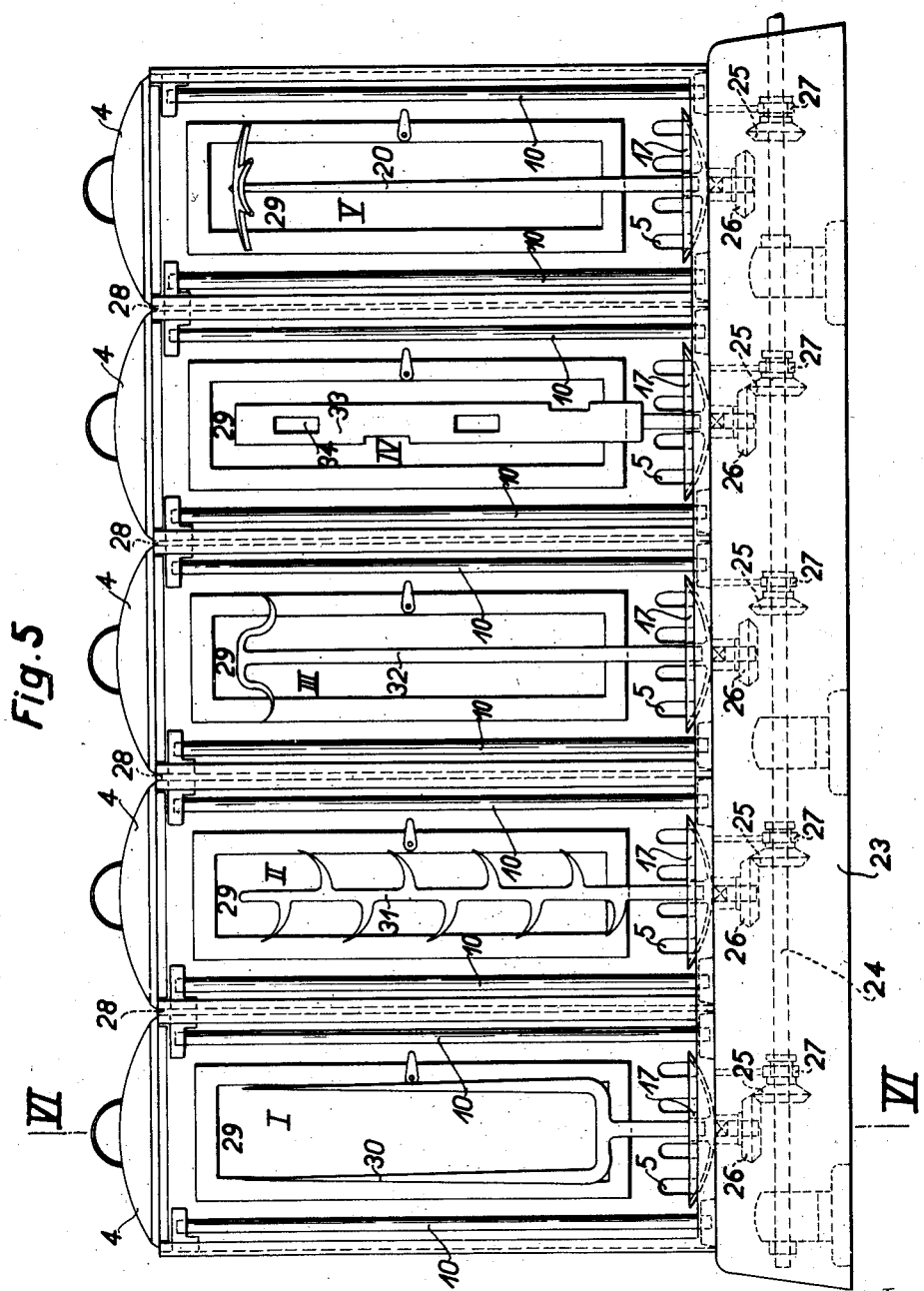

Fig. 4 a detail on an enlarged scale of the structure of the fitting of the drip pan to the spit supporting rod and the driving means, Fig. 5 the apparatus unit of Fig. 1 in multiple unit arrangement, Fig. 6 a section according to line VI—VI of Fig. 5, Fig. 7 the apparatus unit of Fig. 1 in a simplified form of construction.

The roasting-device proper is built upon an under-part 1 and consists of a frame the longitudinal sides 2 of which are arranged in such a manner that glass plates 3 can be fixed in them. The device is closed by a cover 4. Both in the lower frame and in the cover ventilation-holes 5 and 6 are provided which are adjustable so that the admission of air can be regulated. At the lower end the adjustment can be effected by the button 7 of the slide 8, whereas at the upper end adjustment is effected in a simple manner by a turn of the cap 9. Behind the supports 2 the resistance-wire elements 10 are provided through which a current can be passed and they will then become incandescent. The electric wiring from the switchboard 11 is not shown in the drawings. The strength of the heating-current is regulated by the variable resistance 12 so that the elements 10 become incandescent by degrees. The base 1 further contains an electric motor 13 which is also switched on from the switchboard 11. On the shaft of the motor there is provided a worm 14 which engages the worm-wheel 15. The worm-wheel 15 is fastened on the shaft 16 into which a drop-catching circular pan or basin 17 is fitted by means of a square head so that it can be removed. For this purpose the catching pan is provided with a square journal or shoulder or head 18 which is fitted in the corresponding square recess 19 in the main drive-pin 16. The vertical supporting rod or spit 20 is fastened in the catching-pan 17 either by screwing it into a corresponding recess 21 or by a bayonet-lock or in any other way desired connecting it with the saucer 17 and extends upwards therefrom. The rod or spit 20 may be of various shapes according to the nature of the food to be treated. In the case illustrated in Fig. 1 it is provided at the top with a pronged crown 22 for roasting a fowl. The latter is so disposed with respect to the spit 20 that the spit passes through the hollow made by removal of the entrails and the fowl rests on the crown 22 in such a manner that the breast or the part below the neck lies on the crown 22. The spit with crown 22 is inserted in the hollow part of the fowl without piercing the same.

It is advisable to have the glass plates made in such a manner that they can be pulled out or flapped up with their frames so that they can be easily cleaned.

The manner of working the device is exceedingly simple. After removing the cover 4 the piece of food is fastened on the rod or spit 20 in suspended position, which can be done either inside the apparatus or earlier outside it. In the latter case the food together with the spit is put into the device and the journal 18 is inserted into its underpart 19. The motor 13 is then switched on and the number of revolutions of the spit 20 regulated. In doing so it can also be observed whether the food revolves simultaneously. The cover 4 is then replaced and the electric current for heating of the resistance-elements is switched on. The intensity of the heating can also be regulated as required. The ventilation-holes 5 and 6 are also adjusted. When the interior of the device is heated the cold outer air enters by the air-holes 5 and is evenly distributed by the catching-pan 17 to the sides, so that the cold air cannot touch the food and on the other hand the heat of the dripping fat is moderated so that it cannot burn and therefore has no burnt smell. The hot air exits above by the opening 6. The distribution of air and the action of the heat are thus so regulated in the device, that burning cannot take place, and the food piece assumes a brown color on all sides thereof smoothly and homogeneously. The process of thus cooking the said food piece being at the same time considerably shorter and the heating efficiency is high. The device is automatic and simple in construction and operation, so that it is possible to suspend a low roast in it before a guest at his table and to turn on heating current, so that the guest can observe how the roast is cooked. No further manipulation is necessary, except to tell the guest when it is time to switch off the current.

The arrangement shown in Fig. 5 represents a series of such devices for baking and roasting placed one beside the other, possessing a common drive and which are specially suited for hotels and restaurants. The device which is put upon a substructure suited to this purpose has the side facing the guest made entirely of glass, while on the back doors to open are provided the panels of which are also made of glass. It is particularly advisable to use double glass-panels so that at this point there can be absolutely no loss of heat and complete heat insulation is effected. In the device according to Fig. 5 various utensils such as forks, etagères, suspending hooks, tubes, stands etc. can be introduced.

The multiple unit apparatus is built upon a frame 23. In this frame the driving shaft 24 which actuates the drives for the individual cells I, II, III, IV, V etc. is carried. The drive is effected by screw-, worm- or bevel-gear-wheels 25, 26 in such a way that the bevel-gear-wheel 25 can be engaged or disengaged by a lever 27, according to whichever cell is to be put in or out of operation. The cells are separated from each other by partition-walls and possess the usual electric heating elements 10. The strength of the current through these heating elements is adjustable so that any desired temperature can be obtained.

There are air-admission slits 5 on the side of the door and air-exit slits in the individual covers 4. Both the cover and the front-wall or door-panels 29 are of glass so that the interior can be observed without difficulty. The regulation of the strength of current is effected in the manner known on the service-side of the device. Each working utensil is fitted with a juice-catching pan 17 which can be separately removed and installed, so that the fat caught can be taken off at any time. The suspension-contrivances are of various construction and are adapted each to the particular food to be prepared. In this way there are provided stands 20, forks 30, etagères 31 to put sausages etc. on them, suspension-contrivances 32, oven-pieces 33. In the latter there are provided slits 34. The oven-pieces are particularly suitable to prepare cutlets, the bone of the cutlet being put in the slit 34 so that the cutlet is safely suspended and can be exposed to the heat.

Fig. 7 shows a simple device for the household. In this device the moving mechanism for the turnspits has been done away with and the spit itself which is here shown in the form of a fork is fastened upon a sled 35 which can be pulled in and out. Above the roasting device there is a suspension-basket of wire 36, a sieve or the like in which food introduced through the cover 4 during the roasting process can also be roasted. Here too the walls are to be of glass and can be made either of single panes, of divided glass or of a full cylinder. It is also possible, in a special manner, to use in this device a cylinder of some other material, e. g. porcelain or metal. The heating power in this device can also be adjusted in steps. In this case the spit is carried on a sled 35 which can be slid into a guide of the underframe when the door is opened, the spit being turnable round its journal 37 according to requirements.

Having now particularly described and ascertained the nature of my said invention and in what manner the same is to be performed I declare that what I claim is:

1. In a symmetrical vertical roaster, a substantially vertical supporting rod, means carried by said rod for supporting thereon an article to be roasted, a plurality of heat sources circumferentially disposed around said rod substantially symmetrically on both sides thereof, a vertical pin, means for rotating said pin, a substantially circular drip pan having a downwardly projecting shoulder rigidly removably inset in said pin, the upper surface of said pan being provided with a central recess, said rod having its lower end rigidly removably inset in said recess in said pan and having its upper end unsupported, and means for symmetrically directing a current of air upwardly from beneath said circular drip pan and along the lower surface thereof.

2. In a symmetrical vertical roaster, a substantially vertical supporting rod, means carried by said rod for supporting thereon an article to be roasted, a plurality of heat sources circumferentially disposed around said rod substantially symmetrically on both sides thereof, a vertical pin, means for rotating said pin, a substantially circular drip pan having a downwardly projecting shoulder rigidly removably inset in said pin, the upper surface of said pan being provided with a central recess, said rod having its lower end rigidly removably inset in said recess in said pan and having its upper end unsupported, and means for symmetrically directing a current of air upwardly from beneath said circular drip pan and along the lower surface thereof, said drip pan being so disposed with reference to said heat sources that said drip pan and its contents are not exposed to direct radiant energy from said sources of heat.

3. In a symmetrical vertical roaster, a substantially cylindrical housing, a vertical supporting rod centrally disposed in said housing, means carried by said rod for supporting thereon an article to be roasted, a plurality of heat sources circumferentially disposed around the inside of said housing and substantially symmetrically on both sides of said rod, a vertical pin centrally disposed in the base of said housing, means for rotating said pin, a substantially circular drip pan having a downwardly projecting shoulder rigidly removably inset in said pin, the upper surface of said pan being provided with a central recess, said rod having its lower end rigidly removably inset in said recess in said pan and having its upper end unsupported, the base of said housing being provided with recesses beneath said pan for symmetrically directing a current of air upwardly from beneath said circular drip pan and along the lower surface thereof, said housing being provided on its top with central apertures for the symmetrical passage of air currents therethrough.

4. In a symmetrical vertical roaster, a substantially cylindrical housing, a vertical supporting rod centrally disposed in said housing, means carried by said rod for supporting thereon an article to be roasted, a plurality of heat sources circumferentially disposed around the inside of said housing and substantially symmetrically on both sides of said rod, a vertical pin centrally disposed in the base of said housing, means for rotating said pin, a substantially circular drip pan having a downwardly projecting shoulder rigidly removably inset in said pin, the upper surface of said pan being provided with a central recess, said rod having its lower end rigidly removably inset in said recess in said pan and having its upper end unsupported, the base of said housing being provided with recesses beneath said pan for symmetrically directing a current of air upwardly from beneath said circular drip pan and along the lower surface thereof, said housing being provided on its top with central apertures for the symmetrical passage of air currents therethrough, said drip pan being positioned in a comparatively cool part of said housing and being so disposed with reference to said heat sources that said drip pan and its contents are not exposed to direct radiant energy from said sources of heat.

5. In an electric oven, the combination of a heating chamber casing closed on all sides, top and bottom, electrical heating means within the casing disposed vertically parallel with each other along and contiguous to the opposite sides of the casing substantially the length of the sides, and providing an effective heating zone therebetween, means at the upper part of the casing surrounding an interior air zone above the effective heating zone, a drip receiving means at the lower part of the casing, means for supporting an article to be heated between said heating means and within said effective heating zone and disposed upon said drip receiving means, and means in said casing restricting communication of the air within the casing with the air exterior to the casing, said drip receiving means being within the casing at the lower part thereof and sufficiently near the air communicating means at the lower part of the casing to remain at a substantially lower temperature than that of the effective heating zone, and said upper air zone within the casing being in communication with the air exterior to the casing at the restricted air communicating means at the upper part of the casing.

6. In an electric oven, the combination of a heating chamber casing closed on all sides, top and bottom, electrical heating means within the casing disposed vertically parallel with each other along and contiguous to the opposite sides of the casing substantially the length of the sides, and providing an effective heating zone therebetween, means at the upper part of the casing surrounding an interior air zone above the effective heating zone, a drip receiving means at the lower part of the casing, means for supporting an article to be heated between said heating means and within said effective heating zone and disposed upon said drip receiving means, and means in said casing at the upper and lower parts thereof restricting communication of the air within the casing with the air exterior to the casing, said drip receiving means being within the casing at the lower part thereof sufficiently near the air communicating means at the lower part of the casing to remain at a substantially lower temperature than that of the effective heating zone, and said upper air zone within the casing being in communication with the air exterior to the casing at the restricted air communicating means at the upper part of the casing.

7. In an electric oven, the combination of a heating chamber casing closed on all sides, top and bottom, electrical heating means within the casing disposed vertically parallel with each other along and contiguous to the opposite sides of the casing substantially the length of the sides, and providing an effective heating zone therebetween, means at the upper part of the casing surrounding an interior air zone above the effective heating zone, a drip receiving means at the lower part of the casing, means for supporting an article to be heated between said heating means and within said effective heating zone and disposed upon said drip receiving means, and means in said casing restricting communication of the air within the casing with the air exterior to the casing, said drip receiving means being within the casing at the lower part thereof and in contact with the air exterior to the casing at the restricted air communicating means at the lower part of the casing, said upper air zone within the casing being in communication with the air exterior to the casing at the restricted air communicating means at the upper part of the casing, means in the bottom of casing permitting the removal from said casing of said drip receiving means and the material supporting means disposed thereon, said drip receiving means being within the casing at the lower part thereof and sufficiently near the air communicating means at the lower part of the casing to remain at a substantially lower temperature than that of the effective heating zone, and said upper air zone within the casing being in communication with the air exterior to the casing at the restricted air communicating means at the upper part of the casing.

8. In an electric oven, the combination of a heating chamber casing closed on all sides, top and bottom, electrical heating means within the casing substantially the length of the sides, and providing an effective heating zone therebetween, means at the upper part of the casing surrounding an interior air zone above the effective heating zone, a drip receiving means at the lower part of the casing, means for supporting an article to be heated between said heating means and within said effective heating zone and disposed upon said drip receiving means, and means in said casing restricting communication of the air within the casing with the air exterior to the casing, said drip receiving means being within the casing at the lower part thereof and in contact with the air exterior to the casing at the restricted air communicating means at the lower part of the casing, said upper air zone within the casing being in communication with the air exterior to the casing at the restricted air communicating means at the upper part of the casing, and means for rotating said material supporting means, said drip receiving means being within the casing at the lower part thereof and sufficiently near the air communicating means at the lower part of the casing to remain at a substantially lower temperature than that of the effective heating zone, and said upper air zone within the casing being in communication with the air exterior to the casing at the restricted air communicating means at the upper part of the casing.

9. In an electric oven, the combination of a heating chamber casing closed on all sides, top and bottom, electrical heating means within the casing disposed vertically parallel with each other along and contiguous to the opposite sides of the casing substantially the length of the sides, and providing an effective heating zone therebetween, means at the upper part of the casing surrounding an interior air zone above the effective heating zone, a drip receiving means at the lower part of the casing, means for supporting an article to be heated between said heating means and within said effective heating zone and disposed upon said drip receiving means, and means in said casing restricting communication of the air within the casing with the air exterior to the casing, said drip receiving means being within the casing at the lower part thereof and in contact with the air exterior to the casing at the restricted air communicating means at the lower part of the casing, said upper air zone within the casing being in communication with the air exterior to the casing at the restricted air communicating means at the upper part of the casing, and separate means for supporting material to be heated above the vertical electrical heating means and the first named supporting means, said drip receiving means being within the casing at the lower part thereof and sufficiently near the air communicating means at the lower part of the casing to remain at a substantially lower temperature than that of the effective heating zone, and said upper air zone within the casing being in communication with the air exterior to the casing at the restricted air communicating means at the upper part of the casing.

ALFRED WALTERSPIEL.